Sept. 19, 1944.  J. R. C. QUILTER ET AL  2,358,417
PARACHUTE
Filed Sept. 14, 1942
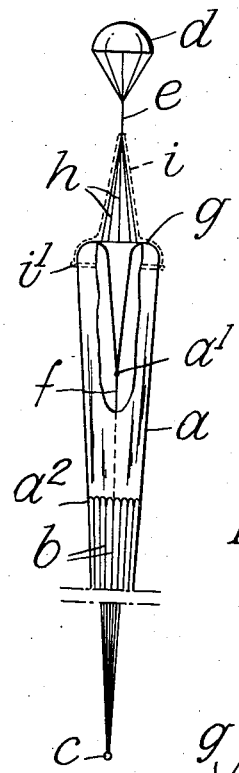
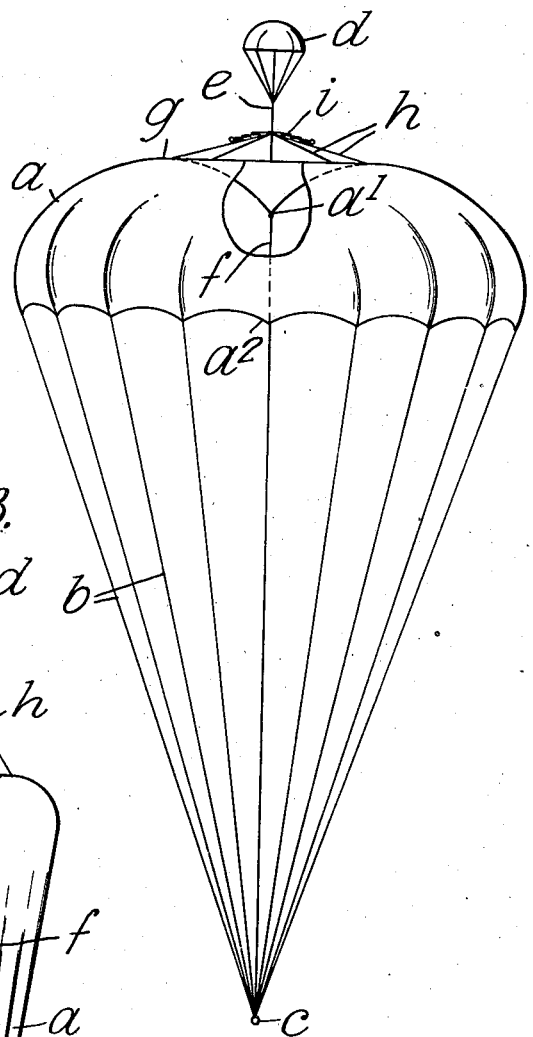
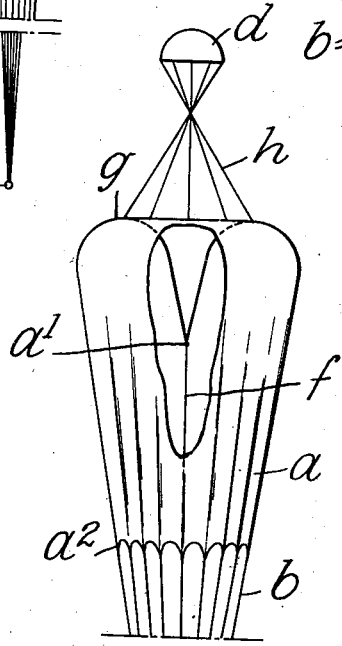
INVENTORS
JOHN RAYMOND CUTHBERT QUILTER
and JAMES GREGORY Patented Sept. 19, 1944

2,358,417

UNITED STATES PATENT OFFICE 2,358,417

PARACHUTE

John Raymond Cuthbert Quilter and James Gregory, Woking, England

Application September 14, 1942, Serial No. 458,268
In Great Britain September 22, 1941

6 Claims. (Cl. 244—142)

This invention relates to parachutes for aviation and like purposes.

The invention has for its main object to provide an improved arrangement for regulating the deployment of the parachute canopy after its extraction from a pack or other container, for example by means of an auxiliary or pilot parachute.

Another object of the invention is to provide an improved parachute canopy having its apex or central portion connected to the aviator's harness or to the load line attachment, in such a way that this apex or central portion is inverted and drawn down towards the level of the periphery.

A further object is to provide an improved form of parachute in which the highest part of the canopy, when extracted from its container and falling with the aviator or load suspended therefrom, is transferred from the apex or central portion to a zone intermediate between said apex or central portion and the periphery.

Other objects and advantages of the invention will hereinafter appear from the following description of two embodiments, given with reference to the accompanying drawing, in which:

Fig. 1 represents a parachute constructed according to the present invention, as extracted from its container by a pilot parachute, and prior to deployment of the main canopy, which is shown partly broken away.

Fig. 2 is an elevation, showing the improved parachute in the open position.

Fig. 3 shows a second construction of parachute according to the invention, the canopy being again partly broken away.

In the case of a normal parachute, the main parachute canopy, having shroud lines extending from its periphery to the loop or grommet for the attachment of the load, is extracted from its pack or other container by a pilot parachute having a cord connected with the apex or center of the main parachute canopy. Prior to deployment of the latter, a large part of the resistance to free fall of the load is furnished by the pilot parachute, with the result that the pull in the apex cord and the total pull in the shroud lines tend to maintain the main canopy in the conical shape which it assumes at the outset; the opening of the canopy is therefore delayed or rendered uncertain to a degree which may prove serious in the case of a short drop.

In the improved construction shown in Figs. 1 and 2, the apex or center $a^1$ of the main parachute canopy $a$ is connected to the loop or grommet $c$ serving for the attachment of the load at the junction of the shroud lines $b$; this connection is effected by a central line $f$ of such length that in the closed position of the parachute, this apex or center is inverted (as compared with the normal arrangement) and drawn down inside the canopy towards the periphery $a^2$. The highest part of the canopy is thereby transferred to a zone $g$ intermediate between the apex or center $a^1$ and the periphery $a^2$, the position of this zone depending on the length of the central line $f$, for a given size of canopy and a given length of shroud line. The tension due to the load and normally borne by the shroud lines alone, is thus taken partly by the central line $f$ connected to the apex $a^1$ of the canopy.

The auxiliary parachute $d$ is connected with the intermediate zone $g$ by a plurality of bridle lines $h$ extending from the lower end of the apex cord $e$, the bridle lines $h$ being preferably secured to the shroud lines $b$ at the points where they traverse the zone $g$ in passing across the canopy. The bridle lines $h$ may be equal in number to the shroud lines $b$ or a sub-multiple of their number; for example, eight bridle lines may be connected with alternate points in a series of sixteen points at which the shroud lines traverse the zone $g$.

By way of example, the intermediate zone $g$ may be of a diameter equal to about one-third of the maximum diameter of the canopy, the apex $a^1$ being drawn to about half-way between the said zone $g$ and the periphery $a^2$ of the canopy in the closed condition; the length of the central connection $f$ will then exceed that of the free portion of each shroud line $b$ by an amount approximately equal to the radius of the intermediate zone when extended, this length being sufficient to allow the canopy to deploy to its full extent when released, as illustrated in Fig. 2. The central connection $f$ may consist of one line or several lines, which may be branched out to several points on the circumference of the vent hole (if provided) in the canopy. This connection shares with the shroud lines $b$ the pull from the pilot parachute $d$ to the load loop $c$ during the initial stage of the drop, so that the shroud lines are partly relieved of tension and the periphery of the main canopy is much more free to open out than in the case of a normal parachute.

In order to avoid entanglement of the attachment or bridle lines $h$, they are preferably enclosed by a conical bag or seamed sock $i$ made of silk or other suitable fabric, with an elastic band or ring $i^1$ around its mouth; the apex of the sock is fitted over or secured to the junction of the bridle lines, at the point where they are connected with the cord e from the auxiliary parachute d, and the elastic mouth is then drawn down over the intermediate zone g of the parachute canopy, as shown in dotted lines in Fig. 1, thus holding said zone as well as the attachment lines h lightly bunched together. During the deployment of the canopy, the elastic mouth of the sock i is forced off the bunched portion of the canopy and caused to travel up the attachment lines h as they open out, the sock collapsing in the manner of a concertina. In the fully open position of the parachute, the attachment lines h will lie radially over the dome of the canopy, their individual length being slightly greater than the radius of the intermediate zone g, as seen in Fig. 2.

Instead of employing separate bridle lines h, with an enclosing bag or sock i, there may be substituted a loose conical bag made of suitable fabric, having its apex secured to the lower end of the cord e and its base attached to the intermediate zone g, the generatrix of the cone being greater than the radius of the intermediate zone.

The invention is not restricted to the relative dimensions given above by way of example; thus, Fig. 3 shows another construction in which the intermediate zone g is of a diameter equal to about one-fifth of the maximum diameter of the canopy a, and the apex $a^1$ is drawn down only to about one-third of the depth from the zone g to the periphery $a^2$ in the closed position. In this case, the length of the central connection f exceeds that of the free portion of each shroud line b by an amount nearly double the radius of the intermediate zone g when extended. The length of each bridle line h must of course be at least equal to the radius of the zone g, in order to allow the canopy to assume its proper dome-like shape when opened out or deployed during the drop.

A static line, attached to an aircraft or other support, or any other convenient means may be employed for extracting the parachute from its container.

What we claim is:

1. A pack parachute comprising a canopy, a load-carrying junction member, shroud lines extending from the periphery of said canopy to said junction member, a tensile connection from said junction member to the central portion of said canopy, means for extracting said parachute from a container, and a plurality of tensile connections from said extracting means to points within the periphery of said canopy but external to said central portion thereof, the length of said first-mentioned tensile connection being such as to draw down said central portion in the shape of an inverted cone below a zone defined by said points during normal descent of said parachute.

2. A pack parachute comprising a canopy, a load-carrying junction member, shroud lines extending from the periphery of said canopy to said junction member, a tensile connection from said junction member to the central portion of said canopy, means for extracting said parachute canopy-first from a container, and a plurality of tensile connections from said extracting means to points within the periphery of said canopy but external to said central portion thereof, said points being spaced around a zone constituting the highest part of said canopy during normal descent of said parachute, and said central portion being then drawn down below said zone by said first-mentioned tensile connection.

3. A pack parachute comprising a canopy, a load-carrying junction member, shroud lines extending across said canopy and from the periphery thereof to said junction member, a tensile connection from said junction member to the central portion of said canopy, means for extracting said parachute canopy-first from a container, said extracting means including a plurality of tensile connections to points upon said shroud lines within the periphery of said canopy but external to said central zone thereof, and a collapsible bag enclosing said last-mentioned tensile connections to prevent their entanglement while extracting said canopy.

4. The combination of a parachute having shroud lines extending from the periphery of the canopy to a load-carrying junction member, a tensile connection from said junction member to the central portion of said canopy, said connection drawing down said central portion into the shape of an inverted cone when said parachute descends with a load, bridle lines attached to points around a zone intermediate between said periphery and said central portion of said canopy, and means for applying tension to said bridle lines, said intermediate zone being the foremost part of said canopy when pulled by tension of said bridle lines, and the length of said tensile connection being such as to draw said central portion down towards the level of said periphery both in the initial condition of said parachute when said canopy is first extended and in the fully deployed condition when descending with the load.

5. The combination of a parachute having shroud lines extending from the periphery of the canopy to a load-carrying junction member, a tensile connection from said junction member to the central portion of said canopy, said connection drawing down said central portion into the shape of an inverted cone when said parachute descends with a load, bridle lines attached to points around a zone intermediate between said periphery and said central portion of said canopy, and a pilot parachute connected to said bridle lines, said intermediate zone being higher than said periphery and central portion of said canopy both when supported in the air by said pilot parachute and when fully air-borne after deployment of said canopy.

6. A parachute comprising a canopy, a load-carrying junction member, shroud lines extending from the periphery of said canopy to said junction member, means for extracting said parachute canopy-first from a container, and a tensile connection from said junction member to the central portion of said canopy, said extracting means being attached to said canopy at points other than and spaced around the center thereof, said shroud lines and tensile member sharing between them the pull due to the load when said parachute is descending, and the partial pull upon said tensile connection then drawing down said central portion of the canopy into an inverted conical shape.

JOHN RAYMOND CUTHBERT QUILTER.
JAMES GREGORY.